May 11, 1954  C. H. THAYER ET AL  2,678,133
CONTINUOUS FILTER
Filed Nov. 17, 1950  2 Sheets-Sheet 2

INVENTORS.
CLARENCE H. THAYER
NELSON F. KING
BY
Busser and Harding
ATTORNEYS

Patented May 11, 1954

2,678,133

UNITED STATES PATENT OFFICE 2,678,133

CONTINUOUS FILTER

Clarence H. Thayer, Media, Pa., and Nelson F. King, Wilmington, Del., assignors to Sun Oil Company, Philadelphia, Pa., a corporation of New Jersey Application November 17, 1950, Serial No. 196,249

8 Claims. (Cl. 210—64)

This invention relates to filtering devices in general, and more particularly to those devices adapted to the continuous filtration of sludge and adsorbent materials in the refining of lubricating oils.

At present, the apparatus used in filtering lubricating oils for the adsorption of impurities and the improvement of color include the centrifuge, filter press, gravity filtration through static beds, and the use of pressure and suction to facilitate the movement of the liquid to be filtered through a filtering surface. These methods and their incidental equipment require constant attention and frequent shut-downs for cleaning. It is an object of this invention to disclose a device which eliminates long and costly shut-down periods and permits a continuous filtering operation.

One objection to known filtering processes is the average low filter rate of the equipment. The high rate of filter capacity with which the apparatus starts the operation is maintained for only a short time and decreases to a state of refusal when the device must be shut down and cleaned. The consequent average production is, therefore, greatly reduced below the initial run-through. It is a further object of the invention to disclose a filtering device which is continuous in operation and maintains a high filter rate.

In general, the disclosed device includes a cylindrical filtering surface enclosed in a housing. The unfiltered liquid is admitted to the housing under pressure and is forced through the cylindrical filtering surface which is continuously rotated. The sludge and purifying materials are rejected by the outer surface of the rotating cylinder as the liquid is forced toward the center of the cylinder. The filtered liquid is removed from the inside of the cylinder and passed from the housing. The sludge and adsorbent material accumulated on the inner wall of the housing by the centrifugal action of the rotating filter surface are periodically removed from the housing without interrupting the operation.

A better understanding of the invention may be had by reference to the following detailed explanation of the device and the accompanying drawings in which.

The forms of filtering equipment, presently in use and as noted above, require intermittent operation with long periods of inactivity for cleaning. In some instances such as where static filtering beds of adsorbent material are used, the life of the bed is extended by activating the filtering material in a reverse direction to the normal flow with cleaning or washing materials. Although the period of operation before replacement is appreciably extended, the activity of the bed between required cleanings is constantly shortened until replacement is mandatory. Continued operation for long periods of time is not possible.

Where centrifuges, as now understood in the art, are used, either alone or in combination with static beds, they are limited in the quantities of foreign matter they can accept and tend to clog quickly because of the centrifugal force of the refuse on the filtering surface. In these instances, it is again necessary to interrupt the operation for cleaning and often the replacement of the rotating filter member.

According to the present invention, advantage is taken of the fact that the centrifugal force of a rotating filter surface flings the foreign material outwardly from the filter surface. Further, if a pressure differential is maintained between the space within the filter surface and the volume surrounding the filter, the liquid free of the removed debris will pass through as the filtrate. Consequently, the filter is free of internal pressure forcing the foreign matter into the surface and will continue to operate indefinitely.

There are additional advantages of the form of device disclosed which will be evident as the detailed description of the elements and operation proceed. The elements of the structure, illustrating a preferred embodiment, are combined and coordinated to assist in the continuous operation of the device.

Figure 1:
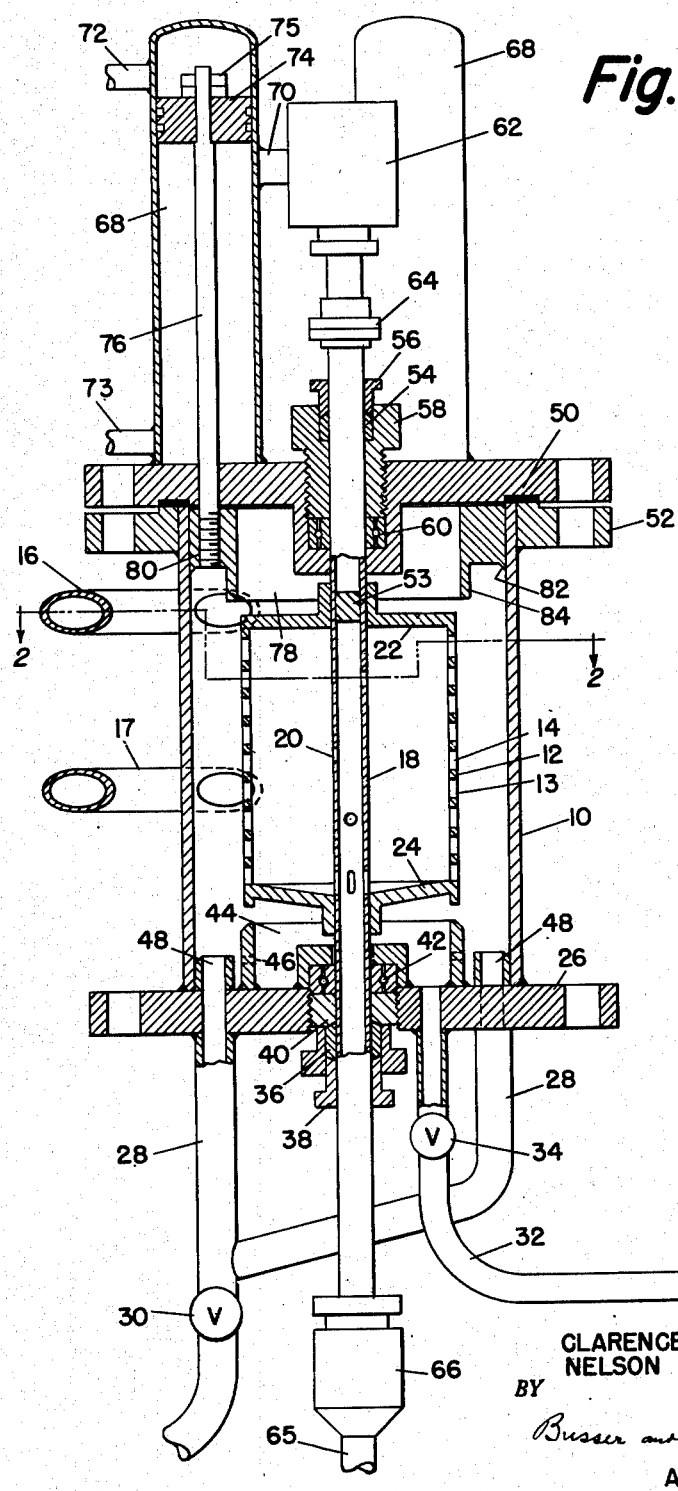
Figure 1 is a sectional view of the filtering device.
Figure 2:
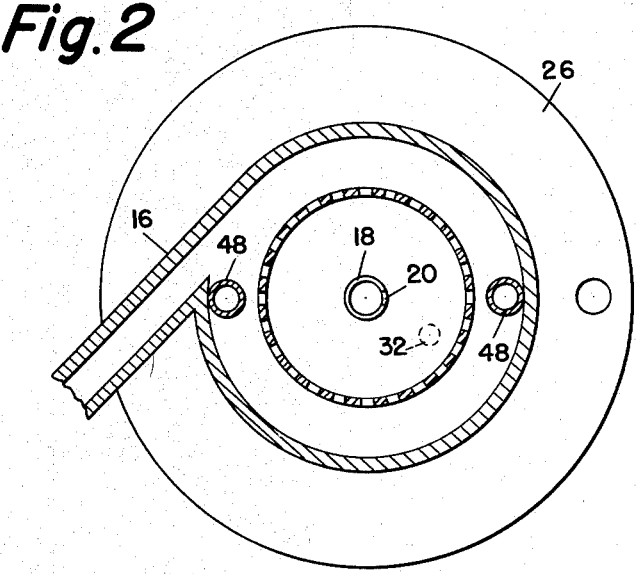
Figure 2 is a sectional view on line 2—2 of Figure 1.

Figure 1 illustrates a preferred embodiment of the filtering device which accomplishes the desired continuous filtering operation. Mounted concentrically within housing 10 is a cylindrical filter 12 with a contact surface 13 which may be a screen, cloth surface or combination of like materials depending upon the type of the unfiltered liquid and the adsorbent material used in the process. In this view, a screen is shown with apertures 14 adapted to permit the flow of liquid inwardly to the center section of the filter 12. The unfiltered liquid flows into the housing 10 through the inlets 16 and 17 which open tangentially into the side wall of the housing 10, shown clearly in sectional Figure 2. The cylindrical filter 12 is spaced from the inner wall of housing 10 and concentrically from a rotatable outlet 18 which is apertured as at 20. The filter 12 is rigidly fixed to the outlet by the imperforate top 22 and bottom 24. These end walls 22 and 24 of the filtering surface enclose the apertures 20 in the outlet 18, requiring the flow of the unfiltered liquid from the body of the housing 10 to pass inwardly through the cylindrical filtering surface 12 in its path through the device. A pressure differential is maintained between the inner face of the filter and the volume surrounding it thereby directing the liquid flow toward the outlet 18.

The cylindrical side walls of the housing 10 are welded to a base flange 26 through which sludge and impurity removal means, such as conduits 28, project into the interior of the housing. A valve 30 in the sludge removal conduit controls this part of the filtering operation as described later. A drain 32, valved as at 34, taps the lowest point of the housing 10 to remove unfiltered liquid and cleaning solutions preliminary to using the device for the filtration of different liquids.

Concentrically arranged within the base flange 26 are conventional packing 36, lock nut 38, bearing retaining bushing 40 and the bearing raceway 42 for the free rotation of the outlet conduit 18. A well 44 with drainage slots 46 is spaced around the outlet tube 18 and encloses the drain 32 preventing sludge from entering the drain during the change-over operations. The sludge receiving means, noted here as conduits 28, project upwardly as at 48 above the bottom of the housing flange 26 to assist in the removal operation as will be more fully understood later.

The upper end of the wall of the housing 10 is closed by flange 50 adapted to be secured to the receiving flange 52, making the housing tight to withstand the operating pressures. The outlet 18, sealed at the top by plug 53 to prevent escape of pressure, is shown projecting upwardly through flange 50, the packing gland 54, retainer 56 and a centering bushing 58, mounted above the bearing raceway 60. A conventional electric motor 62 is shown in this preferred embodiment as the source of power and is directly fastened to the revoluble outlet 18 by the coupling 64. It will be understood that variations of speed for the rotation of the outlet 18 and filtering surface fastened to the outlet, may be obtained by substituting gears of proper ratio in the place of the flexible coupling 64 or other driving devices, if required. The lower end of the filtrate outlet 18 is coupled to a receiving tube or conduit 65 by a conventional air-tight rotating fitting 66.

Figure 3:
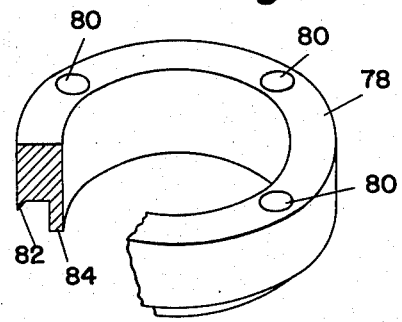
Figure 3 is a perspective view partly in section of one element.

Mounted on the top of the upper flange 50 of the housing 10 are compressed air cylinders 68, preferably three in number, against which the motor 62 is braced as by a spider 70. The number of compressed air cylinders may be increased or decreased depending upon the size of the filtering device and upon the force required in the cleaning operation. Compressed air lines 72 and 73 connect each of the cylinders to admit air pressure, alternately, to the upper and lower faces of piston 74 fastened conventionally as at 75 to a rod 76 which is connected at its lower end to an annular scraper 78, shown in perspective in Figure 3. The scraper 78 is concentrically arranged within the housing 10 to contact, in sliding engagement, the inner walls of the housing. As shown, it is designed not to contact the outer surface of the filtering cylinder 12 which keeps the filter free of impressed residue and injury from the scraper surface. The rod 76 is shown in threaded connection with the scraper 78 at 80. The lower face of the scraper 78 is ground concave on the outer periphery as at 82 to present a sharp scraper edge against the inner surface of the cylindrical housing 10. The inner periphery of the scraper 78, which does not contact the inlet side of the filtering surface 13 as noted, is shown as a flat edge 84 arranged perpendicularly to the filtering face to further prevent injurious contact with the rotating filter during the downward cleaning motion.

The operation of the filtering device, as disclosed here, will be best understood by referring generally to the detailed Figures 1, 2, 3 and 4 which illustrate a preferred embodiment. Unlike the centrifuging devices now used in the petroleum and other industries where the movement of the unfiltered liquid is centrifugally forced outwardly through a rotating filtering surface, the present device shows the unfiltered liquid moving inwardly through the rotating filtering surface 13 of the filter 12 toward a centrally disposed filtrate outlet 18. The unfiltered liquid enters the cylindrical wall of the housing 10 through the tangentially disposed inlets 16 and 17, which are separated vertically a distance at least equal to the depth of the scraper 78 to permit the unfiltered liquid to flow constantly during the scraping operation. As the liquid to be filtered is introduced tangentially to the housing in the direction of rotation of the filter 12, direct impact of the sludge and adsorbent material on the filtering surface is avoided. The unfiltered liquid is under pressure which keeps the housing 10 filled and forces the liquid into filtering contact with and through the rotating filter.

On contact with the rotating filter 12 the filterable particles present in the liquid are thrown outwardly and into contact with the wall of the housing 10 to which they adhere. The liquid pressure within the housing tends to keep these particles, once removed, from moving back into the liquid stream again.

Periodically, depending upon the amount of sludge in the unfiltered liquid and the type and quantity of the adsorbent materials used in the purifying process, the compressed air operated scraper 78 is moved downwardly in the housing. The scraping edge 82 removes the bulk of the separated particles of adsorbent and sludge from the inner walls of housing 10. As indicated above, the edge 84 of the scraper toward the rotating filter does not contact the filter surface 13 which remains free of the filtered residue through the centrifugal action of the rotation. The particles removed from the liquid and scraped from the inner wall of the housing are pressed downwardly and out of the housing through the conduits 28.

As the operation is continuous, the unfiltered liquid entering the housing 10 through the inlets 16 and 17 under pressure, and out through the filtered liquid outlet 18, removal of the sludge and adsorbent material particles must be arranged to continue without interruption. This requirement is met by projecting the sludge removal conduits 28 upwardly into the interior of the housing as shown at 48. When the scraper 78 contacts the lower flange 26 of the housing with the lower edge 84, it seals the receiving end of the conduits against the internal pressure of the housing. The collected particles removed from the liquid are forced into the removal conduits under pressure of the downward movement of the scraper 78. As the scraper remains in sealing engagement with the projecting ends 48, valve 30 is opened allowing the debris to pass out of the conduits. The valve is then closed and the scraper is lifted to normal position by the injection of air under pressure through air inlet 73 applied to the lower surface of the piston 74.

It will be understood that the housing 10 of the device is filled with liquid under pressure at all times during the operation. The downward movement of the scraper 78 is through this body of pressured liquid moving the accumulated residue from the side walls of the housing toward the sludge outlet. As the scraper passes across the tangential unfiltered liquid inlet 16, the supply and pressure is maintained by the inlet 17. The same exchange of operation is accomplished between the inlets as the scraper momentarily blocks the inlet 17 but leaves inlet 16 open. After the lower inlet 17 is passed the liquid in the bottom of the housing 10 is forced around the scraper into the body of the housing until the flat edge 84 blocks the escape beneath the filter cylinder on contact with the well 44. The holes 46 in the well still permit some liquid displacement but this is also shut off by the edge 84 as the scraper closes down on the upwardly projecting sludge receivers 48. This agitates the liquid in the bottom of the housing during the downward movement of the scraper 78 and displaces the filtered residue which has accumulated between the upstanding sludge receivers 48. Consequently, as the sludge is drawn off after the scraper is in sealing contact with the receivers 48 to prevent loss of pressure and the escape of the unfiltered liquid, the action described is constantly removing the residue and does not permit it to accumulate and interrupt the operation.

Figure 4:
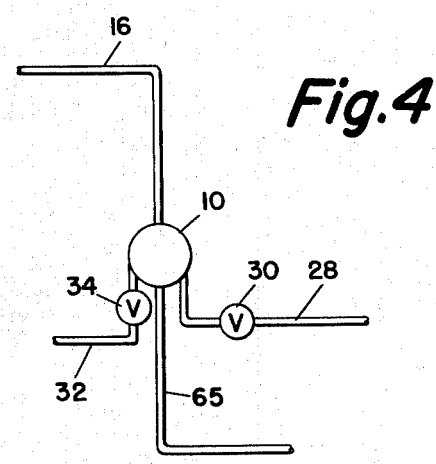
Figure 4 is a diagram of a typical installation.

Figure 4 is a diagrammatic sketch in plan of a suggested installation. The piping arrangement alone is shown, the electrical connections to motor 62 having been omitted for clarity. The liquid to be filtered, containing solids and semisolids is admitted to the filtering device, noted here as the numeral 10 used above to indicate the housing only, through the inlet 16 which is above a like inlet 17 understood, but not shown. The filter and its component parts operate as described and the solid residue is removed through the conduit 28 controlled by the valve 30. The filtrate is removed continuously through the outlet pipe 65 controlled to maintain the pressure differential within the filter for required proper operation. The drain 32, normally closed by valve 34, is operable as already noted to condition the filter for changes in the liquid to be passed through the device.

From the above description, it is apparent that an apparatus is provided which operates continuously to filter foreign materials from liquids. The introduction of the liquid to be filtered is externally of the revolving filter surface and is, thus, contrary to the accepted principles of centrifugal operations common in this art. This approach gives the advantage of maintaining the filter free of obstructing debris which under ordinary filtration practice, clogs the filter surface. Further, it permits continuity of operation by limiting the movement of the removed debris to a readily cleaned enclosure between the filtering surface and the housing. In addition, the disclosed device can be used over a wide range of operations and conditions by adjusting the speed of rotation and the pressure of the liquid feed relationship without further change in the equipment. As it is necessary only to maintain a pressure differential between the outside and inside surfaces of the filter, either pressure or suction can be used, although pressure on the unfiltered liquid as discussed here is the preferred embodiment.

I claim:

1. A filter comprising a housing, unfiltered liquid inlets tangentially engaging said housing in vertically spaced apart arrangement, an apertured filtrate outlet rotatably mounted concentrically of said housing, a filter in said housing mounted to continuously rotate with said filtrate outlet and concentrically spaced between the inlets and the outlet, means to rotate the outlet and filter, an annular member of a depth not in excess of the space between the unfiltered liquid inlets concentrically engaging the inner wall of the housing in vertical scraping contact, and outlet means cooperating with said housing in position to be engaged in sealing contact by the annular member to preserve the internal pressure in the housing and receive the filtered residue accumulated by the action of the annular member.

2. A filter comprising a cylindrical housing, a pair of spaced apart unfiltered liquid inlets in the wall thereof, a filtrate outlet concentrically arranged in said housing to extend longitudinally thereof, a rotatable cylindrical filter adapted to continuously rotate in said housing between the unfiltered liquid inlets and the filtrate outlet, means to rotate said filter, an annular member concentrically engaging the inner wall of the housing in scraping contact, longitudinally slidable therein and of a depth not in excess of the space between the unfiltered liquid inlets to permit uninterrupted flow of liquid to the housing during the scraping action, and means cooperating with the bottom of said housing to receive and dispose of the residue.

3. A device for use in continuous filtering operations comprising a cylindrical housing, unfiltered liquid inlets tangentially engaging said housing in vertically spaced apart arrangement, a tubular filtrate outlet having apertures therein rotatably mounted concentrically of said housing, filtering means connected to said tubular outlet in spaced concentric relation therewith and positioned to enclose the apertures therein, an annular member concentrically engaging the inner wall of the housing in vertical sliding contact adapted to alternately cover the spaced liquid inlets, reciprocally movable pistons connected to said annular member, and means engaging the bottom of said housing to receive the filtered residue as a function of the continuous filtering operation.

4. The device disclosed in claim 3 further characterized by the means to receive the filtered residue including a well enclosure on the bottom of the housing concentrically surrounding the tubular outlet inside the housing below the filter means and positioned to receive the annular member in sealing engagement, and a plurality of conduits projecting upwardly from the bottom of the interior of said housing between the well enclosure and the body thereof to receive the residue and to be sealed at the end of the downward movement of said annular member.

5. A device for use in continuous filtering operations comprising a cylindrical housing, unfiltered liquid inlets tangentially engaging said housing in vertically spaced apart arrangement, a tubular filtrate outlet having apertures therein rotatably mounted concentrically of said housing, rotatable filtering means connected to said tubular outlet in spaced concentric relation therewith and positioned to enclose the tubular filtrate apertures therein, an annular member concentrically engaging the inner wall of the housing in longitudinally slidable contact and of a depth to alternately obstruct the unfiltered liquid inlets, and residue receiving conduits positioned in the bottom of the housing to sealably engage the annular member at the lowermost point in the cleaning operation.

6. In a filter of the type comprising a cylindrical housing, a rotatable cylinder within and concentrically spaced from the housing to provide between them an annular space, and an outlet tube located axially of and rotatable with said cylinder, in which the circumferential wall of the cylinder is a filtering medium and in which the outlet tube is orificed to receive filtered liquid: the improvement which comprises a plurality of inlet conduits for supplying the mixture to be filtered, said inlet conduits being spaced apart vertically with their discharge ends extending tangentially of said annular space to direct the discharge of solid particles against the wall of the housing, and a scraper extending circumferentially through said annular space and reciprocable vertically therethrough, said scraper having a cutting edge engaging the inner wall of the housing and being of a thickness, measured vertically, substantially less than the distance between the inlet conduits and being of a width, measured radially of the housing, somewhat less than the radial width of said annular space so as to avoid engaging the filtering wall of the cylinder.

7. In a filter defined in claim 6, an annular partition within, and extending upward from the bottom of, the housing and spaced from the cylindrical housing wall and forming an annular pocket to receive the sludge, and outlet tubes for the sludge the inlet ends of which extend upward within said pocket into sealing contact with the scraper at about the completion of its downward stroke, and into which the sludge is forced by said scraper.

8. In a filter defined in claim 7, a drain tube communicating with the central space in the bottom of the housing enclosed within said annular partition through which unfiltered liquid, cleaning solution and the like may be withdrawn preparatory to the filtering operation.

References Cited in the file of this patent

UNITED STATES PATENTS

| Number | Name | Date |
|---|---|---|
| 660,214 | Gathmann | Oct. 23, 1900 |
| 802,922 | Evans | Oct. 24, 1905 |
| 1,107,485 | Bowser | Aug. 18, 1914 |
| 1,219,796 | Atkins et al. | Mar. 20, 1917 |
| 1,312,316 | Gee | Aug. 5, 1919 |
| 1,682,757 | Hopkins | Sept. 4, 1928 |
| 1,858,574 | Bonsiakos | May 17, 1932 |
| 1,987,142 | Clements, Jr. | Jan. 8, 1935 |
| 2,173,060 | Andrews | Sept. 12, 1939 |
| 2,442,234 | Dunmire | May 25, 1948 |
| 2,596,384 | Dunmire | May 13, 1952 |

FOREIGN PATENTS

| Number | Country | Date |
|---|---|---|
| 320,371 | Great Britain | Oct. 7, 1929 |